United States Patent
Mellor et al.

(10) Patent No.: US 11,559,969 B2
(45) Date of Patent: Jan. 24, 2023

(54) LAMINATED GLASS AND METHOD OF MANUFACTURING THE SAME

(71) Applicants: PILKINGTON GROUP LIMITED, Lancashire (GB); NIPPON SHEET GLASS CO., LTD., Tokyo (JP)

(72) Inventors: Leigh Francis Mellor, St Helens (GB); Mark Andrew Chamberlain, Ormskirk (GB); Graham Siddons, Ellesmere Port Cheshire (GB); Ryohei Ogawa, Tokyo (JP); Kazuki Chiba, Tokyo (JP); Hisashi Ogawa, Tokyo (JP)

(73) Assignees: PILKINGTON GROUP LIMITED, Lancashire (GB); NIPPON SHEET GLASS CO., LTD., Tokyo (JP)

( * ) Notice: Subject to any disclaimer, the term of this patent is extended or adjusted under 35 U.S.C. 154(b) by 541 days.

(21) Appl. No.: 16/479,455

(22) PCT Filed: Jan. 19, 2018

(86) PCT No.: PCT/GB2018/050157
§ 371 (c)(1),
(2) Date: Jul. 19, 2019

(87) PCT Pub. No.: WO2018/134608
PCT Pub. Date: Jul. 26, 2018

(65) Prior Publication Data
US 2019/0381766 A1 Dec. 19, 2019

(30) Foreign Application Priority Data

Jan. 20, 2017 (JP) .............................. JP2017-008689
Jul. 26, 2017 (GB) .................................... 1712058

(51) Int. Cl.
B32B 17/10 (2006.01)

(52) U.S. Cl.
CPC .. *B32B 17/10036* (2013.01); *B32B 17/10348* (2013.01); *B32B 17/10385* (2013.01);
(Continued)

(58) Field of Classification Search
CPC ................................................. B32B 17/10036
See application file for complete search history.

(56) References Cited

U.S. PATENT DOCUMENTS

| 3,903,396 A | 9/1975 | Boaz et al. |
| 4,644,139 A | 2/1987 | Harrison et al. |

(Continued)

FOREIGN PATENT DOCUMENTS

| EP | 0849977 A2 | 6/1998 |
| JP | 2013056811 A | 3/2013 |

(Continued)

OTHER PUBLICATIONS

Search Report dated Jan. 12, 2018 by the Intellectual Property Office in British Patent Application No. GB1712058.5 (6 pgs).
(Continued)

*Primary Examiner* — Ian A Rummel
(74) *Attorney, Agent, or Firm* — Buchanan Ingersoll & Rooney PC

(57) ABSTRACT

A laminated glass comprising an outer glass sheet, an inner glass sheet, and an intermediate layer between the outer and inner glass sheets. The intermediate layer has a first busbar, a second busbar, and heating wires connecting the first and second busbars, and a sheet-like substrate supporting the heating wires. The intermediate layer further comprises an adhesive layer. A distance from a centre of the wires to a surface the outer glass sheet and a distance from the centre of the wires to a surface the inner glass sheet being different; and a distance from the centre of the wires to the inside surface of the outer glass sheet and a distance from the (Continued)

centre of the wires to the outside surface of the inner glass sheet being different, and the adhesive layer thickness or the substrate thickness, whichever is smaller, is not more than 400 micrometres.

19 Claims, 4 Drawing Sheets

(52) U.S. Cl.
CPC ... *B32B 17/10761* (2013.01); *B32B 17/10779* (2013.01); *B32B 17/10788* (2013.01)

(56) References Cited

U.S. PATENT DOCUMENTS

| | | | |
|---|---|---|---|
| 2002/0061395 A1* | 5/2002 | Moran | B32B 17/10761 428/215 |
| 2007/0164015 A1* | 7/2007 | Carpino, II | H05B 3/34 219/528 |
| 2011/0233182 A1* | 9/2011 | Baranski | H05B 3/86 219/203 |
| 2016/0311402 A1 | 10/2016 | Suetsugu et al. | |
| 2017/0041987 A1 | 2/2017 | Weber | |
| 2017/0135155 A1 | 5/2017 | Klein et al. | |
| 2017/0291398 A1 | 10/2017 | Chamberlain et al. | |
| 2022/0185238 A1 | 6/2022 | Suetsugu | |

FOREIGN PATENT DOCUMENTS

| | | |
|---|---|---|
| JP | 2015168584 A | 9/2015 |
| JP | 2016060668 A | 4/2016 |
| WO | 2004082934 A1 | 9/2004 |
| WO | 2007039747 A1 | 4/2007 |
| WO | WO-2010146107 A1 * | 12/2010 ....... B32B 17/10688 |
| WO | 2013035778 A1 | 3/2013 |
| WO | 2015162107 A1 | 10/2015 |
| WO | 2016000927 A1 | 1/2016 |
| WO | 2016038372 A1 | 3/2016 |
| WO | 2016080406 A1 | 5/2016 |
| WO | 2017077128 A1 | 5/2017 |
| WO | 2017204291 A1 | 11/2017 |

OTHER PUBLICATIONS

International Search Report (PCT/ISA/210) dated May 3, 2018, by the British Patent Office as the International Searching Authority for International Application No. PCT/GB2018/050157 (3 pgs).
Decision to Grant a Patent issued in Japanese Patent Application No. 2019-539266, dated Feb. 22, 2022, with English Translation (5 pages).
Notification to Grant Patent Right for Invention issued in Chinese Patent Application No. 201880007605.X, dated Feb. 8, 2022, with English Translation (3 pages).
Notice of Reasons for Refusal issued in Japanese Patent Application No. 2019-539266, dated Sep. 14, 2021, English Translation only (7 pages).
First Office Action issued in Chinese Patent Application No. 201880007605.X, dated Aug. 11, 2021, English Translation only (7 pages).
Second Office Action issued in Chinese Patent Application No. 201880007605.X, dated Nov. 15, 2021, English Translation only (8 pages).
Communication issued in corresponding European Patent Application No. 18 701 550.8-1102, dated Feb. 22, 2022 (2 pages).
Office Action issued in corresponding European Patent Application No. 18 701 550.8, dated Feb. 22, 2022 (3 pages).
English Translation of WO2013035778A1 (10 pages).
English Translation of WO2017204291A1 (34 pages).

\* cited by examiner

LAMINATED GLASS AND METHOD OF MANUFACTURING THE SAME

FIELD OF THE INVENTION

The invention is concerned with a laminated glass and a method of manufacturing a laminated glass.

It is known that laminated glass for buildings or vehicles on land, sea or air may need defogging or defrosting. On low air temperature days and in cold climates, the windshields of automobiles often fog up, impairing operation. Therefore, various methods have been proposed to eliminate the fogging up of windshields. For example, Patent Document 1 discloses busbars and heating wires arranged inside a windshield to raise a temperature of the windshield by means of resistance heat, so that the windshield is defogged or defrosted to ensure a field of view for a passenger. Patent Document 2 discloses busbars and heating wires arranged inside a windshield and an adhesive layer arranged between a busbar and a ply of interlayer material.

PRIOR ART DOCUMENTS

Document 1: US 2016-0311402 A1 (Dai Nippon Printing Co Ltd, Suetsugu).
Document 2: WO 2016-038372 A1 (Pilkington Group Limited, Chamberlain)

SUMMARY OF THE INVENTION

Problem Solved by the Invention

The present inventors have discovered the following problem related to a laminated glass. When an electric current is applied to the heating wires and laminated glass is heated up, outside objects appear to be wavy when viewed through the laminated glass. When investigating the cause, the present inventors discovered that resin layers surrounding the heating wires are distorted by the heat and the distortion causes the refractive index of an intermediate layer to change.

It is an object of the present invention to solve this problem by providing a laminated glass able to prevent an excessive rise in temperature around the heating wires.

MEANS OF SOLVING THE PROBLEM

The present invention provides, in a first aspect, in a first embodiment, a laminated glass comprising an outer glass sheet having a first edge and a second edge opposing the first edge, an inner glass sheet arranged opposite the outer glass sheet and having substantially the same shape as the outer glass sheet, and an intermediate layer arranged between the outer glass sheet and the inner glass sheet; the intermediate layer having a heat-generating layer comprising a first busbar extending along an end portion on the first edge side, a second busbar extending along an end portion on the second edge side, and a plurality of heating wires arranged so as to connect the first busbar and the second busbar, and a sheet-like substrate (311) for supporting at least the plurality of heating wires among both busbars wherein the intermediate layer further comprises an adhesive layer (33) adjoining the heat-generating layer wherein a distance (Z1, Z2) from a centre of the heating wires in a thickness direction to a surface (S1, S2) of the outer glass sheet and a distance (Z3, Z4) from the centre of the heating wires in a thickness direction to a surface (S3, S4) of the inner glass sheet being different; and a distance (Z2) from the centre of the heating wires in the thickness direction to the inside surface (S2) of the outer glass sheet and a distance (Z3) from the centre of the heating wires in the thickness direction to the outside surface (S3) of the inner glass sheet being different wherein the thickness of the adhesive layer (33) or the thickness of the substrate (311) whichever having smaller thickness is not more than 400 micrometres, preferably is not more than 380 micrometres.

In the laminated glass the thickness of the adhesive layer (33) or the thickness of the substrate (311) whichever having smaller thickness is in a range from 10 to 100 micrometres.

In the laminated glass, the thickness of the outer glass sheet and the thickness of the inner glass sheet can be different.

In the laminated glass, the heat-generating layer can be arranged from the centre of the intermediate layer in the thickness direction on either the outer glass sheet side or the inner glass sheet side.

In the laminated glass, the heat-generating layer can be arranged so as to come into contact with the outer glass sheet or the inner glass sheet.

In the laminated glass, the intermediate layer can further comprise an adhesive layer adjoining the heat-generating layer.

In the laminated glass, the heat-generating layer can comprise a sheet-like substrate for supporting at least the plurality of heating wires among both busbars and the plurality of heating wires, and at least the plurality of heating wires can be arranged so as to come into contact with the outer glass sheet or the inner glass sheet.

In the laminated glass, the heat-generating layer can come into contact with the outer glass sheet.

In the laminated glass, the heat-generating layer can be arranged so as to come into contact with the inner glass sheet.

In the laminated glass, the intermediate layer can comprise two adhesive layers sandwiching the heat-generating layer, the thickness of each of the adhesive layers being different.

In the laminated glass, the thickness of the adhesive layer with the smaller thickness between the pair of adhesive layers or the thickness of the substrate can be from 5 micrometres to 300 micrometres, more preferably 10 micrometres to 100 micrometres, most preferably 20 micrometres to 50 micrometres.

In the laminated glass, the heat-generating layer can comprise a sheet-like substrate for supporting at least the plurality of heating wires among both busbars and the plurality of heating wires, the surface of the plurality of heating wires can be subjected to blackening treatment, the plurality of heating wires can be arranged on the outer glass sheet side, and the substrate can be arranged on the inner glass sheet side.

In the laminated glass, the distance (Z2) from the centre of the heating wires in the thickness direction to the inside surface (S2) of the outer glass sheet or the distance (Z3) from the centre of the heating wires in the thickness direction to the outside surface (S3) of the inner glass sheet is not more than 400 micrometres, preferably not more than 380 micrometres, preferably not more than 300 micrometres, preferably not more than 200 micrometres, more preferably not more than 139 micrometres, most preferably not more than 90 micrometres.

In the laminated glass, the distance (Z2) from the centre of the heating wires in the thickness direction to the inside surface (S2) of the outer glass sheet or the distance (Z3)

from the centre of the heating wires in the thickness direction to the outside surface (S3) of the inner glass sheet is not less than 5 micrometres, preferably not less than 11 micrometres, more preferably not less than 31 micrometres, most preferably not less than 51 micrometres.

In the laminated glass, the plurality of heating wires may be in contact with either the outer glass sheet or the inner glass sheet.

In the laminated glass, the plurality of heating wires can comprise copper, tungsten, silver or molybdenum or alloys thereof.

In the laminated glass, the plurality of heating wires can consist of copper, tungsten or molybdenum in a purity of at least 90 mass percent, more preferably 99 mass percent.

In the laminated glass, each heating wire in cross-section can have a shape of a circle, an oval, a triangle, a square, a rectangle or a trapezoid.

In the laminated glass, each heating wire can have width not less than 3 micrometre and not more than 500 micrometres, more preferably not less than 5 micrometres and not more than 20 micrometres, and most preferably not less than 8 micrometres and not more than 15 micrometres.

In the laminated glass, each heating wire can have thickness not less than 1 micrometre and not more than 100 micrometres, more preferably not less than 3 micrometres and not more than 20 micrometres, and most preferably not less than 8 micrometres and not more than 12 micrometres.

In the laminated glass, the busbars and the plurality of heating wires can be formed integrally.

In the laminated glass, an interval between adjacent heating wires is preferably from 1 to 4 mm, more preferably from 1.25 to 3 mm and most preferably from 1.25 to 2.5 mm.

In the laminated glass, the plurality of heating wires can be printed, etched, transferred or preformed.

In the laminated glass, the substrate, an adhesive layer or the pair of adhesive layers can be provided as a film, a wedged film, an embossed film or sprayed.

In the laminated glass, the substrate can comprise PET or PVB, more preferably plasticiser-free PVB.

In the laminated glass, the adhesive layer or the pair of adhesive layers can comprise PVB, more preferably PVB having an adhesion control additive.

In the laminated glass, the substrate, the adhesive layer or the pair of adhesive layers can be provided with an infrared absorbing layer.

The present invention provides, in a second aspect, in a first embodiment a method of manufacturing a laminated glass comprising the steps:

providing an outer glass sheet having a first edge and a second edge opposing the first edge arranging an inner glass sheet opposite the outer glass sheet, wherein said inner glass sheet has substantially the same shape as the outer glass sheet arranging an intermediate layer between the outer glass sheet and the inner glass sheet, the intermediate layer having a heat-generating layer comprising a first busbar extending along an end portion on the first edge side, a second busbar extending along an end portion on the second edge side arranging a plurality of heating wires so as to connect the first busbar and the second busbar, arranging a sheet-like substrate (311) for supporting at least the plurality of heating wires among both busbars wherein the intermediate layer further comprises an adhesive layer (33) adjoining the heat-generating layer wherein a distance (Z1, Z2) from a centre of the heating wires in a thickness direction to a surface (S1, S2) of the outer glass sheet and a distance (Z3, Z4) from the centre of the heating wires in a thickness direction to a surface (S3, S4) of the inner glass sheet being different; and a distance (Z2) from the centre of the heating wires in the thickness direction to the inside surface (S2) of the outer glass sheet and a distance (Z3) from the centre of the heating wires in the thickness direction to the outside surface (S3) of the inner glass sheet is different and wherein the thickness of the adhesive layer (33) or the thickness of the substrate (311) whichever having smaller thickness is not more than 400 micrometres, preferably is not more than 380 micrometres.

In the method of manufacturing a laminated glass the thickness of the adhesive layer (33) or the thickness of the substrate (311) whichever having smaller thickness is in a range from 10 micrometres to 100 micrometres.

In the method of manufacturing a laminated glass, the intermediate layer can further comprise a second adhesive layer adjoining the heat-generating layer.

In the method of manufacturing a laminated glass, the plurality of heating wires can be arranged so as to come in contact with the outer glass sheet or the inner glass sheet.

In the method of manufacturing a laminated glass, the heat generating layer can be arranged so as to come into contact with the outer glass sheet or the inner glass sheet.

In the method of manufacturing a laminated glass, the plurality of heating wires can be arranged so as to come into contact with the outer glass sheet or the inner glass sheet.

In the method of manufacturing a laminated glass, a pair of adhesive layers can sandwich the heat-generating layer.

In the method of manufacturing a laminated glass, the plurality of heating wires can comprise copper, tungsten or molybdenum or alloys thereof.

In the method of manufacturing a laminated glass, the plurality of heating wires can consist of copper, tungsten or molybdenum in a purity of at least 90 mass percent, more preferably 99 mass percent.

In the method of manufacturing a laminated glass, each heating wire in cross-section can have a shape of a circle, an oval, a triangle, a square, a rectangle or a trapezoid.

In the method of manufacturing a laminated glass, each heating wire can have width not less than 3 micrometre and not more than 500 micrometres, more preferably not less than 5 micrometres and not more than 20 micrometres, and most preferably not less than 8 micrometres and not more than 15 micrometres.

In the method of manufacturing a laminated glass, each heating wire can have thickness not less than 1 micrometre and not more than 100 micrometres, more preferably not less than 3 micrometres and not more than 20 micrometres, and most preferably not less than 8 micrometres and not more than 12 micrometres.

In the method of manufacturing a laminated glass, the busbars and the plurality of heating wires can be formed integrally.

In the method of manufacturing a laminated glass, an interval between adjacent heating wires is preferably from 1 to 4 mm, more preferably from 1.25 to 3 mm and most preferably from 1.25 to 2.5 mm.

In the method of manufacturing a laminated glass, comprising a step of providing the plurality of heating wires by printing, by etching, by transfer or as preformed wires.

In the method of manufacturing a laminated glass, the substrate, the adhesive layer or the pair of adhesive layers can be provided as a film, a wedged film, an embossed film or sprayed.

In the method of manufacturing a laminated glass, the substrate can comprise PET or PVB, more preferably plasticiser-free PVB.

In the method of manufacturing a laminated glass, the adhesive layer or the pair of adhesive layers can comprise PVB, more preferably PVB having an adhesion control additive.

In the method of manufacturing a laminated glass, the substrate, the adhesive layer or the pair of adhesive layers can be provided with an infrared absorbing layer.

In the method of manufacturing a laminated glass, further comprising a step of laminating the outer glass sheet, the intermediate layer and the inner glass sheet together at elevated temperature and elevated pressure for a predetermined period.

The present invention provides, in a third aspect, in a first embodiment, use of a laminated glass in a vehicle for transport on land, water or in the air.

The present invention provides, in a third aspect, in a second embodiment, use of a laminated glass in a building.

The present invention provides, in a third aspect, in a third embodiment, use of a laminated glass in digital signage or a refrigerator door.

Effect of the Invention

Laminated glass of the present invention is able to prevent an excessive rise in temperature around the heating wires.

BEST MODE FOR CARRYING OUT THE INVENTION

Figure 1:
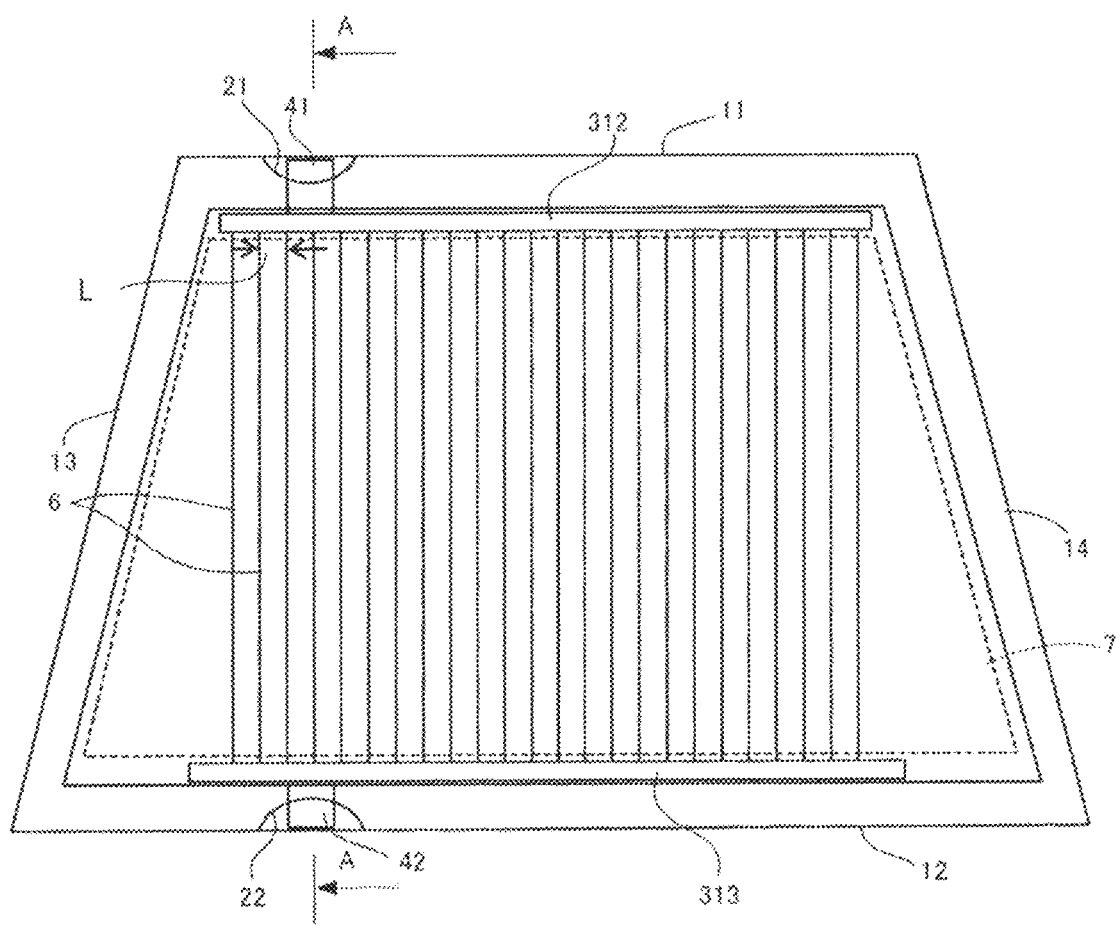
FIG. 1 is a plan view of the laminated glass in the first embodiment of the present invention.
Figure 2:
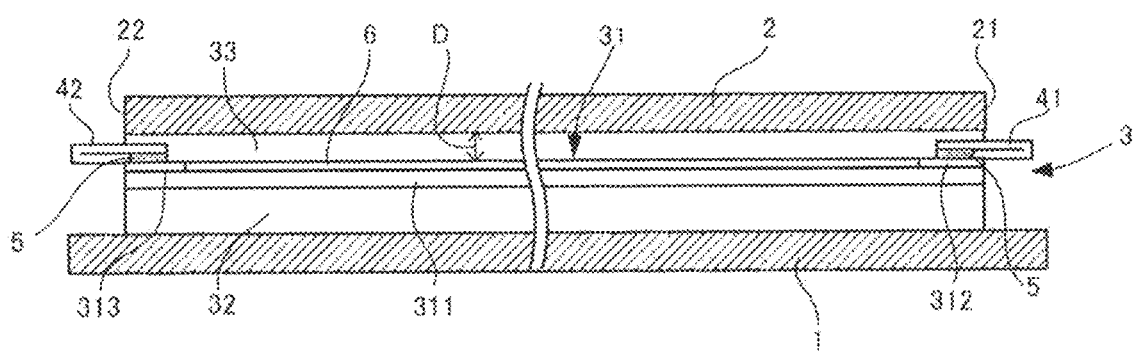
FIG. 2 is a cross-sectional view from line A-A in FIG. 1.

The following is a description with reference to the drawings of laminated glass in an embodiment of the present invention applied to a windshield. FIG. 1 is a plan view of the windshield in the present embodiment, and FIG. 2 is a cross-sectional view of FIG. 1. As shown in FIG. 1 and FIG. 2, the windshield in the present embodiment comprises an outer glass sheet 1, an inner glass sheet 2, and an intermediate layer 3 arranged between the glass sheets 1, 2. Notches 21, 22 may be formed in the upper end portion and lower end portion of the inner glass sheet 2, and connecting members 41, 42 extending from the intermediate layer 3 may be exposed in each of the notches 21, 22. The following is an explanation of each member.

Laminated Glass

1. Overview of the Laminated Glass 1-1. Glass Sheets

Each glass sheet 1, 2 may have any shape, for example a long rectangular shape in which the lower edge 12 is longer than the upper edge 11. As mentioned above, arc-shaped notches may be formed in the upper end portion and lower end portion of the inner glass sheet 2. In the following explanation, the notch formed in the upper end portion of the inner glass sheet 2 is referred to as the first notch 21, and the notch formed in the lower end portion is referred to as the second notch 22. Any glass sheet common in the art can be used as each glass sheet 1, 2. Examples include heat-absorbing glass, general clear glass, or UV green glass. However, these glass sheets 1, 2 must realize the levels of visible light transmittance set forth in the national safety standards for automobiles. For example, adjustments can be made so that the required solar radiation absorption rate is met by the outer glass sheet 1 and the safety standards for visible light transmittance are met by the inner glass sheet 2. The following are examples of clear glass, heat-absorbing glass, and soda-lime glass compositions.

Clear Glass $SiO_2$: 70-73 mass %
$Al_2O_3$: 0.6-2.4 mass %
CaO: 7-12 mass %
MgO: 1.0-4.5 mass %
$R_2O$: 13-15 mass % (where R is an alkali metal)
All Iron Oxides Converted to $Fe_2O_3$ ($T-Fe_2O_3$): 0.08-0.14 mass %

Heat-Absorbing Glass. A composition for heat-absorbing glass can be obtained from the composition for clear glass by changing the percentage of all iron oxides converted to $Fe_2O_3$ ($T-Fe_2O_3$) to 0.4 to 1.3 mass %, a percentage of $CeO_2$ to 0 to 2 mass %, a percentage of $TiO_2$ to 0 to 0.5 mass %, and reducing the skeletal components of the glass (mainly $SiO_2$ and $Al_2O_3$) by the increased amounts of $T-Fe_2O_3$, $CeO_2$, and $TiO_2$.

Soda-Lime Glass

|  | mass % |
| --- | --- |
| $SiO_2$ | 65-80 |
| $Al_2O_3$ | 0-5 |
| CaO | 5-15 |
| MgO | ≥2 |
| NaO | 10-18 |
| $K_2O$ | 0-5 |
| MgO + CaO | 5-15 |
| $Na_2O + K_2O$ | 10-20 |
| $SO_3$ | 0.05-0.3 |
| $B_2O_3$ | 0-5 |
| All Iron Oxides Converted to $Fe_2O_3$ ($T-Fe_2O_3$) | 0.02-0.03 |

As mentioned above, each glass sheet 1, 2 may form a rectangle, and the ratio of the length of the upper edge 11 to the lower edge 12 can be from 1:1.04 to 1:1.5. For example, when the upper edge is 1,200 mm, the lower edge can be from 1,250 to 1,800 mm. More specifically, the upper edge can be 1,195 mm and the lower edge can be 1,435 mm. The ratios described above are the ratios of the two-dimensional plane when the windshield is projected from the front.

In other words, FIG. 1 shows an example in which the lower edge 12 is long, but the present invention can also be applied to a windshield in which the upper edge 11 is long. For example, in a windshield for a compact, single-occupant vehicle, when the upper edge is 500 mm, the lower edge can be from 350 to 450 mm. More specifically, the upper edge can be 500 mm and the lower edge can be 425 mm.

There are no particular restrictions on the thickness of the laminated glass in the present embodiment, but from the standpoint of weight reduction, the total thickness of both the outer glass sheet 1 and the inner glass sheet 2 may be from 2 to 6 mm, preferably from 2.4 to 4.6 mm, more preferably from 2.6 to 3.9 mm, and most preferably from 2.7 to 3.7 mm. The total thickness of both the outer glass sheet 1 and the inner glass sheet 2 has to be reduced in order to reduce the weight, but there are no particular restrictions on the thickness of each glass sheet. For example, the thickness of the outer glass sheet 1 and the thickness of the inner glass sheet 2 can be determined in the following manner.

The outer glass sheet 1 primarily requires durability and impact resistance with respect to external hazards. For example, when the laminated glass is used as a windshield in an automobile, impact resistance is required with respect to small, flying objects such as pebbles. When this sheet is thicker, the weight increases to an undesirable extent. From this standpoint, the thickness of the outer glass sheet 1 is preferably from 1.0 to 3.0 mm, and more preferably from 1.6 to 2.3 mm. The thickness can be determined on the basis of the intended use for the glass.

The thickness of the inner glass sheet 2 can be the same as that of the outer glass sheet 1. However, from the standpoint of reducing the weight of the laminated glass, the thickness can be smaller than that of the outer glass sheet 1. Taking into account glass strength, the thickness is preferably from 0.6 to 2.0 mm, preferably from 0.8 to 1.8 mm, and even more preferably from 0.8 to 1.6 mm, most preferably from 0.8 to 1.3 mm. The thickness of the inner glass sheet 2 can be determined on the basis of the intended use for the glass.

When the heating wires 6 in the intermediate layer 3 described below are arranged in the centre of the intermediate layer 3 in the thickness direction, the thickness of both glass sheets 1, 2 may be different. The thickness of each glass sheet is determined largely by the intended use.

1-2. Intermediate Layer

The following is an explanation of the intermediate layer 3. The intermediate layer 3 is preferably three layers consisting of a heat-generating layer 31 and a pair of adhesive layers 32, 33 sandwiching the heat-generating layer 31. In the explanation of the present embodiment, the adhesive layer arranged on the outer glass sheet 1 side is referred to as the first adhesive layer 32 and the adhesive layer arranged on the inner glass sheet 2 side is referred to as the second adhesive layer 33.

1-2-1. Heat-Generating Layer

First, the heat-generating layer 31 will be explained. The heat-generating layer 31 is composed of a sheet-like substrate 311, and a first busbar 312, a second busbar 313, and a plurality of heating wires 6 arranged on the substrate 311. The substrate 311 can be formed in a rectangular shape corresponding to that of the glass sheets 1, 2. However, it does not have to have the same shape as the glass sheets 1, 2, and it may be smaller than the glass sheets 1, 2. As shown in FIG. 1, it can be shorter than the length between the notches 21, 22 so that the notches 21, 22 on the inner glass sheet 2 are unobstructed in the vertical direction. The horizontal length of the substrate 311 can also be shorter than the width of the glass sheets 1, 2.

The first busbar 312 is formed so as to extend along the upper edge of the substrate 311. The second busbar 313 is formed so as to extend along the lower edge of the substrate 311 and may be longer than the first busbar 312. When the intermediate layer 3 is sandwiched between the glass sheets 1, 2, the busbars 312, 313 are situated to the inside of the notches 21, 22 mentioned above so as not to be exposed by the notches 21, 22. The width of each busbar 312, 313 is preferably from 5 to 50 mm, and more preferably from 10 to 30 mm. When the width of the busbars 312, 313 is less than 5 mm, the heat spot phenomenon may occur in which a great amount of heat is produced by the heating wires. When the width of the busbars 312, 313 is greater than 50 mm, the field of view may be obstructed by the busbars 312, 313. Each busbar 312, 313 may be formed along the substrate 311 with precision. In other words, the edges of the substrate 311 may not be completely parallel but rather curved.

The heating wires 6 are formed so as to extend between, and connect, the busbars 312, 313. The heating wires 6 may be substantially parallel, or may fan out, for example, for full area heating of a trapezoidal shape. The heating wires 6 do not have to be linear. They can assume various shapes such as a wave shape. When the heating wires 6 have a sinusoidal shape, the heat distribution may be more uniform and optical obstruction of the field of view through the windshield by the heating wires 6 can be prevented.

The width of each heating wire 6 is preferably from 3 to 500 micrometres, more preferably from 5 to 20 micrometres, and even more preferably from 8 to 15 micrometres. When the width is smaller, they are less conspicuous and more suitable for use in the windshield in the present embodiment. An interval L between adjacent heating wires 6 is preferably from 1 to 4 mm, more preferably from 1.25 to 3 mm and even more preferably from 1.25 to 2.5 mm. The interval of the heating wires 6 can be measured under a microscope such as the VHX-200 (from Keyence Corporation) at a magnification factor of 1,000. When the heating wires 6 are formed with a sinusoidal shape, the distance between the center lines of heating wires 6 is used as the interval between heating wires 6.

The following is an explanation of the material used as the heat-generating layer 31. The substrate 311 is a transparent film used to support both busbars 312, 313 and the heating wires 6. There are no particular restrictions on the material that is used. Examples include polyethylene terephthalate (PET), polyethylene (PE), polymethyl methacrylate (PMMA), polyvinyl chloride (PVC), polyester, polyolefin, polycarbonate, polystyrene, polypropylene, and nylon. Other materials that can be used include polyvinyl butyral resin (PVB) and ethylene vinyl acetate (EVA). Both busbars 312, 313 and the heating wires 6 can be made using the same material. Various materials can be used. Examples include copper (or tin-plated copper), tungsten, and silver.

Next, the method used to form the busbars 312, 313 and the heating wires 6 will be explained. The busbars 312, 313 and the heating wires 6 can be formed by arranging thin pre-formed wires on the substrate 311. However, to further reduce the width of the heating wires 6, the heating wires 6 can be formed by creating a pattern on the substrate 311. There are no particular restrictions on the method. Various methods can be used, such as printing, etching, and transferring. The busbars 312, 313 and heating wires 6 can be formed individually or integrally. Here, 'integrally' means the material is seamless and interface free.

The following is an example in which etching is performed. First, metal foil is dry-laminated on the substrate 311 via a primer layer. The metal foil can be copper. A pattern with both busbars 312, 313 and the heating wires 6 can then be formed integrally on the substrate 311 by chemically etching the metal foil using the photolithographic method. When the width of the heating wires 6 is smaller (for example, 15 micrometres or less), thin metal foil is preferably used. A thin metal layer (for example, 5 micrometres or less) can be deposited or sputtered on the substrate 311 and then patterned using photolithography. Note that the surface of the heating wires 6 on the inner glass sheet 2 side can be blackened to reduce their visibility from inside the vehicle. The material used in the blackening process can be copper nitride, copper oxide, nickel nitride, or nickel chromium. The blackening can be performed by plating the wires using any of these materials.

1-2-2. Adhesive Layers

Both adhesive layers 32, 33 are sheet-like members sandwiching the heat-generating layer 31 and bonded to the glass sheets 1, 2. The adhesive layers 32, 33 are formed with the same size as both glass sheets 1, 2. Notches can be formed in the adhesive sheets 32, 33 which have the same shape as and correspond to the positions of the notches 21, 22 in the inner glass sheet 2. These adhesive layers 32, 33 can be made of a variety of materials. Examples include polyvinyl butyral (PVB) and ethylene vinyl acetate (EVA) resins. A polyvinyl butyral resin is preferred because it adheres well to the glass sheets and has superior pierce resistance. A surfactant layer can be provided between the heat-generating layer 31 and the adhesive layers 32, 33. The surfactant modifies the surface of both layers and improves the adhesive strength. An adhesive layer may be provided without plasticiser, so as to increase rigidity and so avoid or reduce formation wrinkles.

1-2-3. Thickness of the Intermediate Layer

There are no particular restrictions on the overall thickness of the intermediate layer 3, but from 0.3 to 6.0 mm is preferred, from 0.5 to 4.0 mm is more preferred, and from 0.6 to 2.0 mm is even more preferred. The thickness of the substrate 311 in the heat-generating layer 31 is preferably from 5 to 200 micrometres, and more preferably from 10 to 100 micrometres. The thickness of each adhesive layer 32, 33 is preferably greater than the thickness of the heat-generating layer 31. It is preferably from 0.01 to 1.0 mm, and more preferably from 0.1 to 0.38 mm. In order for the second adhesive layer 33 to adhere closely to the substrate 311, the thickness of the busbars 312, 313 and heating wires 6 interposed between them is preferably from 1 to 100 micrometres, more preferably from 3 to 20 micrometres, most preferably from 10 to 12 micrometres. Busbars 32, 313 may be etched from a metal foil, printed or made from a metal sheet, for example copper or tin-plated copper.

The thickness of both adhesive layers 32, 33 is different. The difference in thickness can be established depending on the intended use as described below. In the example shown in FIG. 2, the thickness of the second adhesive layer 33 is smaller, but the thickness of the first adhesive layer 32 can be smaller. For example, between the adhesive layers 32, 33, the thickness D of the thinner of the adhesive layers is preferably from 5 to 300 micrometres, preferably from 5 to 200 micrometres, and more preferably from 20 to 100 micrometres.

The thicknesses of the heat-generating layer 31 and the adhesive layers 32, 33 can be measured in the following way. First, a cross-section of the laminated glass is observed under a microscope at a magnification factor of 175 (for example, using the VH-5500 from Keyence Corporation). The thicknesses of the heat-generating layer 31 and the adhesive layers 32, 33 are then visually identified and measured. In order to eliminate visual disparities, the measurements are performed five times and the average values are used as the thicknesses of the heat-generating layer 31 and the adhesive layers 32, 33.

The thicknesses of the heat-generating layer 31 and the adhesive layers 32, 33 constituting the intermediate layer 3 do not have to be constant over the entire surface. For example, it can be wedge-shaped in laminated glass used in head-up displays. In this case, the heat-generating layer 31 and the adhesive layers 32, 33 constituting the intermediate layer 3 reach their maximum thickness along the top edge portion, or the bottom edge portion, of the laminated glass and are measured there. When the intermediate layer 3 is wedge-shaped, the outer glass sheet 1 and the inner glass sheet 2 are not arranged in parallel, yet this arrangement is included among glass sheets of the present invention. For example, in the present invention, the outer glass sheet 1 and the inner glass sheet 2 can include an intermediate layer 3 composed of a heat-generating layer 31 and adhesive layers 32, 33 in which the thickness increases at a rate of 3 mm or less per 1 m.

1-3. Connecting Members

The following is an explanation of the connecting members. The connecting members 41, 42 are connected to both busbars 312, 313 and to connection terminals (anode terminals or cathode terminals, not shown), and are created in sheet form using a conductive material. A power-supply voltage may be greater than 12 V, for example 13.5 V or 48 V, and may be applied to the connection terminals. In the following explanation, the connecting member connected to the first busbar 312 is referred to as the first connecting member 41, and the connecting member connected to the second busbar 313 is referred to as the second connecting member 42. The configuration of both connecting members 41, 42 may be the same, so the following explanation will focus primarily on the first connecting member 41.

Figure 8:
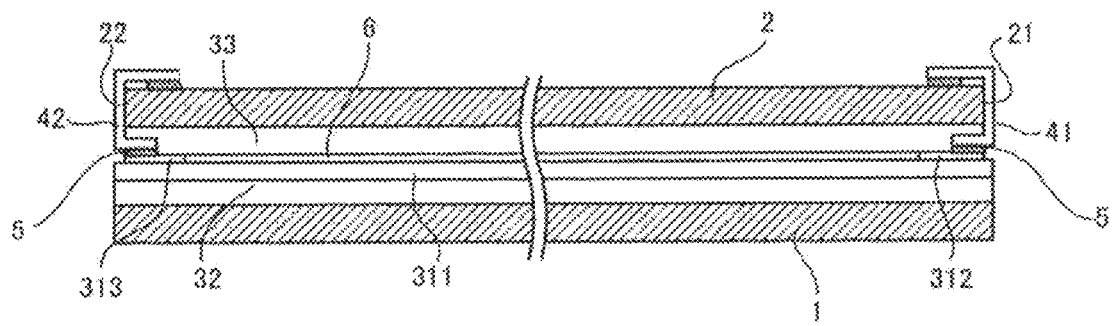
FIG. 8 is a cross-sectional view of the laminated glass in another embodiment of the present invention.

The first connecting member 41 is rectangular and is interposed between the first busbar 312 and the second adhesive layer 33. It is fixed to the first busbar 312 by a fixing material 5 such as solder. The fixing material 5 can be fixed in the autoclave during assembly of the windshield described below. Therefore, it is preferably solder with a low melting point such as 150° C. or less. The first connecting member 41 extends from the first busbar 312 along the upper edge of the outer glass sheet 1 and is exposed by the first notch 21 formed in the inner glass sheet 2. In the exposed portion, a cable extending from the power supply is connected to the connection terminal using a fixing material such as solder. Neither connecting member 41, 42 protrudes from the end portion of the glass sheets 1, 2, and both are fixed to connection terminals in the portion of the inner glass sheet 2 exposed by the notches 21, 22. Because both connecting members 41, 42 are made of a thin material, the bent ends can be fixed to the busbar 312 using a fixing material 5 as shown in FIG. 2. An advantage of notches 21, 22 is that connecting members 41, 42 do not protrude from the end portions of glass sheets 1, 2 as shown in FIG. 2. If connecting members 41, 42 are flexible connectors then the notches 21, 22 may be small, as shown in FIG. 8. Flexible connectors allow a laminated glass to be manufactured without notches 21, 22.

1-4. Concealing Layer

As shown in FIG. 1, a concealing layer 7 made of a dark ceramic such as a black ceramic is laminated on the peripheral edges of the laminate glass. This concealing layer 7 shields the field of view from inside the vehicle or from outside the vehicle. It is laminated along all four edges of the laminated glass. The busbars 312, 313 are arranged in positioned covered by the concealing layer 7. In the drawings, reference number 7 denotes the inner edge of the concealing layer 7.

The concealing layer 7 can be on S2, the inside surface of the outer glass sheet 1, or on S4, the inside surface of the inner glass sheet 2, or on both S2 and S4. Surface references are shown on FIG. 10. This layer can be made of a ceramic or other type of material. For example, the following composition can be used.

TABLE 1

|  |  | First and Second Colour Ceramic Paste |
|---|---|---|
| Pigment *1 | mass % | 20 |
| Resin (Cellulose Resin) | mass % | 10 |
| Organic Solvent (Pine Oil) | mass % | 10 |
| Glass Binder *2 | mass % | 65 |
| Viscosity | dPs | 150 |

*1 Main Ingredients: Copper oxide, chromium oxide, iron oxide, and manganese oxide
*2 Main Ingredients: Bismuth borosilicate, zinc borosilicate A ceramic can be formed using the screen printing method or can be created by transferring film to the glass sheet and then firing the transferred film. A ceramic can be formed with the screen printing method using a 355-mesh polyester screen, a coating thickness of 20 micrometres, 20 Nm of tension, a squeegee hardness of 80 degrees, a mounting angle of 75°, and a printing speed of 300 mm/s. The resulting concealing layer is then dried for 10 minutes at 150° C. in a drying furnace.

Instead of a ceramic print, the concealing layer 7 can be concealing film made of a dark resin that has been affixed to the glass sheet.

Method of Manufacturing a Laminated Glass

2. Windshield Manufacturing Method

The following is an explanation of a windshield manufacturing method according to the invention. Any known apparatus may be used, including a lehr furnace, advanced press bending or a box furnace, and laminating apparatus. First, an example of a glass sheet production line will be described.

Figure 3:
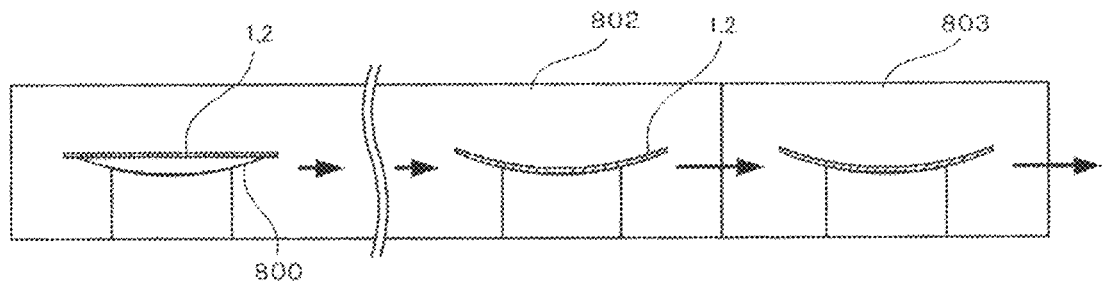
FIG. 3 is a side view of the furnace through which the mold passes.
Figure 4:
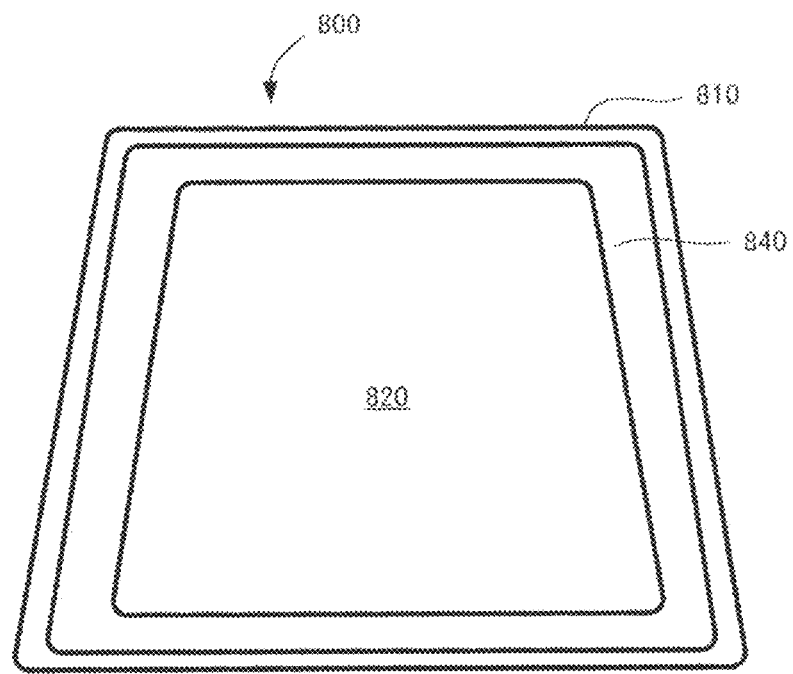
FIG. 4 is a plan view of the mold.

Here, the mold will be described in detail with reference to FIG. 3 and FIG. 4. FIG. 3 is a side view of the furnace through which the mold passes, and FIG. 4 is a plan view of the mold. As shown in FIG. 4, the mold 800 has a frame-like mold unit 810 which conforms to the outside shape of both glass sheets 1, 2. Because this mold unit 810 is in the shape of a frame, there is an interior space 820 which passes through the inside in the vertical direction. The peripheral edges of both glass sheets 1, 2 are placed on the upper surface of the mold unit 810. Heat is applied to the glass sheets 1, 2 from a heater (not shown) arranged beneath via the interior space 820. The heat softens the glass sheets 1, 2, which begin to curve downward due to gravity. A shielding plate 840 is arranged on the inner peripheral edges of the mold unit 810 to provide heat shielding. This can be used to adjust the heat to which the glass sheets 1, 2 are subjected. The heater does not have to be arranged below the mold 800. It can also be arranged above the mold.

After printing a concealing layer 7 on the flat outer glass sheet 1 and inner glass sheet 2, the outer glass sheet 1 and inner glass sheet 2 are stacked on top of each other, and passed through a heating furnace 802 shown in FIG. 3 while supported by the mold 800. When heat has been applied inside the heating furnace 802 to a temperature approaching the softening point temperature, both glass sheets 1, 2 begin to curve downward from the peripheral edges due to gravity and a curved shape is formed. Next, both glass sheets 1, 2 are transported from the heating furnace 802 to an annealing furnace 803 where annealing is conducted. Afterwards, both glass sheets 1, 2 are transported out of the annealing furnace 803 and allowed to cool.

When the outer glass sheet 1 and the inner glass sheet 2 have been formed in this manner, the intermediate layer 3 is interposed between the outer glass sheet 1 and the inner glass sheet 2. More specifically, the outer glass sheet 1, the first adhesive layer 32, the heat-generating layer 31, the second adhesive layer 33, and the inner glass sheet 2 are laminated in this order. At this time, the surface of the heat-generating layer 31 on which the first busbar 312 has been formed is facing the second adhesive layer 33, as shown in FIG. 2. The vertical end portions of the heat-generating layer 31 are arranged to the inside of the notches 21, 22 in the inner glass sheet 2. The notches in the first and second adhesive layers 32, 33 are also aligned with the notches 21, 22 in the inner glass sheet 2. The outer glass sheet 1 is exposed by the notches 21, 22 in the inner glass sheet 2. Next, a connecting member 41, 42 is inserted from each notch 21, 22 between the heat-generating layer 31 and the second adhesive layer 33. At this time, low melting point solder is applied to each connecting member 41, 42 as the fixing material 5, and solder is placed on top of each busbar 312, 313. Optionally, connecting members 41, 42 may be flexible connectors soldered to the busbars 312, 313 before introducing the inner glass sheet 2. Busbars 312, 313 may be integrally formed with the heating wires 6, and optionally may comprise a metal sheet.

The laminate consisting of both glass sheets 1, 2, the intermediate layer 3, and the connecting members 41, 42 is placed in a rubber bag, and the laminate is pre-bonded at 70 to 110° C. in a vacuum. The pre-bonding can be performed using another method suitable for notches. The following is an example. The laminate is heated at 45 to 65° C. in an oven. Next, 0.45 to 0.55 MPa of pressure is applied to the laminate using a roll. Again, the laminate is heated in an oven at 80 to 105° C. and then subjected to 0.45 to 0.55 MPa of pressure using a roll. This completes the pre-bonding. In a method suitable for flexible connectors, pre-bonding may be performed using a vacuum ring.

Next, the main bonding is performed. The pre-bonded laminate is bonded in an autoclave at a temperature from 100 to 150° C. under 8 to 15 atm. For example, the laminate can be bonded at 135° C. under 14 atm. Alternatively the laminate can be bonded at 125° C. During pre-bonding and the bonding, the adhesive layers 32, 33 with the heat-generating layer 31 interposed between them are bonded to the glass sheets 1, 2. Also, the solder on the connecting members 41, 42 melts and the connecting members 41, 42 are fixed to the busbars 312, 313. The laminated glass in the present embodiment is manufactured in this way. Another method that can be used to manufacture a curved windshield is the press bending method.

INDUSTRIAL APPLICATION

3. Use of the Windshield

A windshield with this configuration is installed in a car body and connection terminals are fixed to the connecting members 41, 42. Afterwards, when the connection terminals are electrified, current is applied to the heating wires 6 via the connecting members 41, 42 and the busbars 312, 313, and heat is generated. This heat eliminates fogging on an inside surface S4 of the windshield or defrosts an outside surface S1 of the windshield.

Use of the Laminated Glass

A laminated glass according to the invention is also suitable in architectural applications, to improve safety or security of heated glazing buildings. Laminated glass according to the invention is also suitable for use in other heated glazing applications including refrigerator doors, white goods and furniture.

Technical Effects

4. Technical Effects

The following effects can be obtained in the present embodiment.

(1) Because the thickness of the adhesive layers 32, 33 is different and the heat-generating layer 31 is closer to either the outer glass sheet 1 or to the inner glass sheet 2, more heat is generated towards the glass sheet 1, 2 closer to the heat-generating layer 31. Because the adhesive layers 32, 33 are made of a resin material, the thermal conductivity is lower than that of the glass sheets 1, 2. However, because the heat capacity of the glass sheets 1, 2 is greater than that of the resin material, the dissipation of heat from the heat-generating layer 31 to the glass sheets 1, 2 can be promoted. In this way, the temperature of the adhesive layers 32, 33 on the periphery of the heat-generating layer 31 is kept from rising to an excessive level.

When the dissipation of heat from the heat-generating layer 31 to the glass sheets 1, 2 is insufficient, the temperature of the adhesive layers 32, 33 at a surface of the heat-generating layer 31 rises locally to an excessive level. As a result, the density may change and the adhesive layers 32, 33 may become distorted due to expansion of the material. The refractive index of the adhesive layer may also change. This is what led to one of the inventors discovering the waviness problem while looking outside a vehicle via laminated glass. In the present embodiment, the temperature of the adhesive layers 32, 33 on the periphery of the heat-generating layer 31 can be kept from rising to an excessive level. As a result, deformation of the adhesive layers 32, 33 can be suppressed and flickering or shimmering of objects outside of a vehicle viewed through laminated glass can be prevented. The inventors have discovered a three step process, whereby temperature is kept from rising, so temperature difference inside the interlayer can be suppressed, therefore a refractive index difference is reduced and optical distortion (shimmer) is suppressed.

(2) When the heat-generating layer 31 is closer to the inner glass sheet 2 as shown in FIG. 2, the inner glass sheet 2 is heated to a greater extent and fogging of the inner glass sheet 2 can be prevented. When the heat-generating layer 31 is closer to the outer glass sheet 1, the outer glass sheet 1 is heated to a greater extent and the outer glass sheet 1 can be defrosted more effectively.

(3) Because the busbars 312, 313 and the heating wires 6 may be made of the same material, the linear expansion coefficient of the busbars 312, 313 and the heating wires 6 can be the same. This confers the following advantage. When the busbars 312, 313 and the heating wires 6 are made of different materials, they have different coefficients of linear expansion. When these members are made separately and then attached to each other, the heating wires may peel off the busbars and the two sheets of glass constituting the laminate glass may separate from one another under harsh environmental changes such as those in a heat cycle test. If the busbars 312, 313 and the heating wires 6 in the present embodiment are made of the same material, these problems can be prevented.

(4) If the busbars 312, 313 and the heating wires 6 are integrally formed, contact defects and thus heating defects between the two can be eliminated. The following is a detailed explanation of these heating defects. When a sheet of glass is heated to eliminate fogging, the current value is restricted in order to keep the upper limit value of the heating temperature between, for example, 70 and 80° C., and prevents cracking of the glass. If localized heating occurs due to the contact resistance explained above, the current value has to be controlled in these places using the upper limit value for the heating temperature. As a result, the generation of heat by all heating wires cannot be adequately controlled. However, the heating wires in the configuration described above can be controlled as a whole to generate sufficient heat while also preventing localized overheating.

(5) The heat-generating layer 31 in which the busbars 312, 313 and the heating wires 6 are arranged to be sandwiched between adhesive layers 32, 33 and arranged between glass sheets 1, 2. As a result, the heat-generating layer 31 can be reliably fixed to both glass sheets 1, 2. Also, by covering the busbars 312, 313 and the heating wires 6 with the second adhesive layer 33, contact with a glass sheet can be prevented. As a result, cracking of the glass can be prevented.

(6) In the present embodiment, the busbars 312, 313 are connected to external terminals using two connecting members 41, 42. As an alternative to this arrangement, wide busbars can be prepared, the unneeded portions of the busbars can be cut and angled, and these portions can be exposed by the notches 21, 22 to serve as connecting members. However, the angled portions of the cut busbars may experience localized heating. Because separate connecting members 41, 42 are fixed to each busbar 312, 313 in the present embodiment, localized heating can be prevented.

(7) In the present embodiment, the busbars 312, 313 are arranged, respectively, along the upper edge 11 and the lower edge 12 of the glass sheets 1, 2. As a result, the busbars 312, 313 can be shielded from view by the concealing layer 7, improving the overall appearance of the windshield.

Other Modes for Carrying Out the Invention

5. Modified Examples

An embodiment of the present invention was explained above, but the present invention is not limited to this embodiment. Various modifications are possible without departing from the spirit and scope of the invention. The following modified examples can be combined when appropriate.

<5.1> In the embodiment described above, the busbars 312, 313 were formed so as to be concealed by a concealing layer 7. However, they do not have to be concealed by a concealing layer 7. In other words, a concealing layer 7 does not have to be provided.

<5.2> In the embodiment described above, the intermediate layer 3 consisted of a total of three layers, namely, a heat-generating layer 31 and a pair of adhesive layers 32, 33. However, the intermediate layer 3 can be composed simply of busbars 312, 313 and heating wires 6. Therefore, even a substrate 311 does not have to be provided in the heat-generating layer 31.

Figure 5:
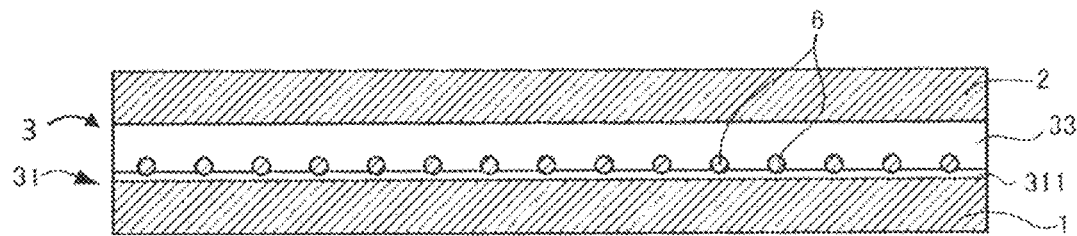
FIG. 5 is a cross-sectional view of the laminated glass in another embodiment of the present invention.
Figure 5A:
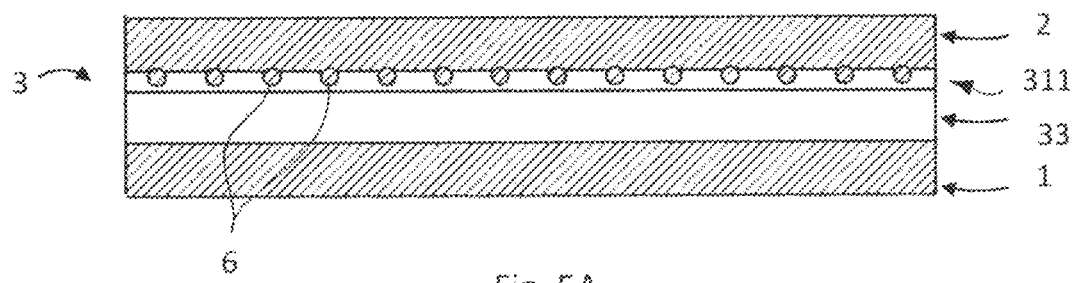
FIG. 5A is a cross-sectional view of the laminated glass in another embodiment of the present invention.

Also, as shown in FIG. 5, a single adhesive layer 33 can be provided. In the example shown in FIG. 5, the heat-generating layer 31 is arranged so as to come into contact with the outer glass sheet 1, and the adhesive layer 33 is arranged between the heat-generating layer 31 and the inner glass sheet 2. In the heat-generating layer 31, the substrate 311 is arranged on the outer glass sheet 1 side, and the heating wires 6 are arranged on the inner glass sheet 2 side. In this configuration, heat from the heat-generating layer 31 is effectively dissipated towards the outer glass sheet 1. This can keep the temperature of the adhesive layer 33 from rising to an excessive level. In this example, the heat-generating layer 31 comes into contact with the outer glass sheet 1. However, the lamination can also be performed in the following order: outer glass sheet 1, adhesive layer 33, heat-generating layer 31, and inner glass sheet 2, as shown in FIG. 5A.

Figure 6:
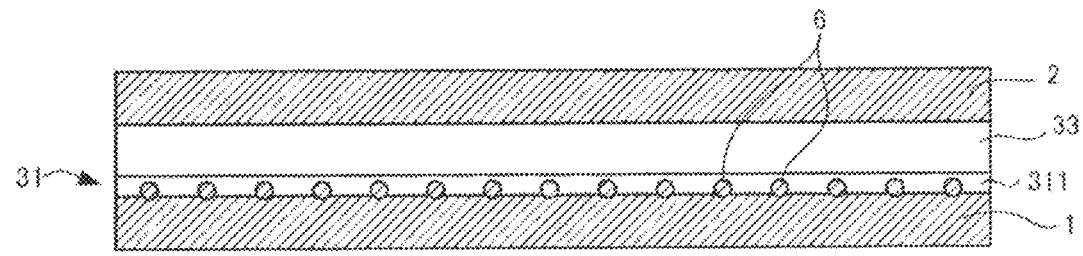
FIG. 6 is a cross-sectional view of the laminated glass in another embodiment of the present invention.

Also, as shown in FIG. 6, the orientation of the heat-generating layer 31 can be changed so that the substrate 311 is arranged on the outer glass sheet 1 side and the heating wires 6 are arranged on the side of the inner glass sheet 2. In this case, the substrate 311 supporting the heating wires can be made of the same material as the adhesive layer 33, for example, PVB. The substrate 311 and the adhesive layer 33 can be integrated during the production process (for example, in the autoclave step) to eliminate the visible interface between them. FIG. 5 shows a situation in which substrate 311 and the adhesive layer 33 have not been integrated and the interface between them is visible.

Figure 7:
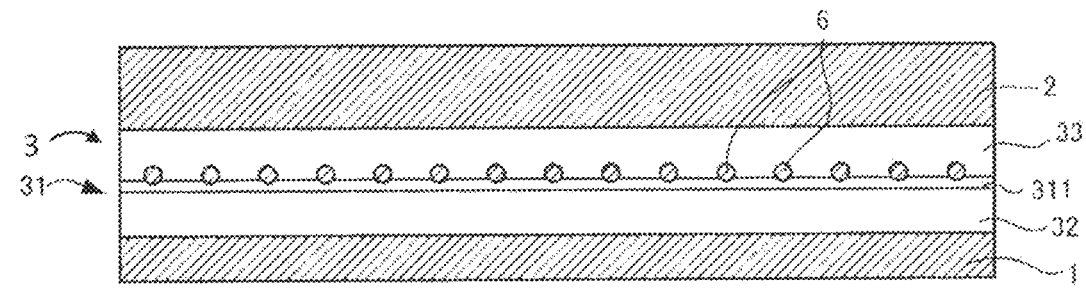
FIG. 7 is a cross-sectional view of the laminated glass in another embodiment of the present invention.

<5.3> In the embodiment described above, the position of the heat-generating layer 31 (or the heating wires 6) inside the intermediate layer 3 is closer to the outer glass sheet 1 or the inner glass sheet 2 than to the centre in the thickness direction of the intermediate layer 3. In this situation, the thickness of the outer glass sheet 1 and the inner glass sheet 2 is different. For example, as shown in FIG. 7, the thickness of the inner glass sheet 2 can be increased. Because the heat capacity of the thicker inner glass sheet 2 is greater than the heat capacity of the thinner outer glass sheet 1, heat from the heat-generating layer 31 dissipates more readily towards the inner glass sheet 2, and this keeps the temperature of the adhesive layers 32, 33 from rising to an excessive level. Note that the thickness of the outer glass sheet 1 can also be greater than that of the inner glass sheet 2.

<5.4> The heat-generating layer 31 can have any shape. For example, a heat-generating layer 31 in which both busbars 312, 313 and the heating wires 6 have been formed beforehand on the substrate 311 can be cut into the desired shape and arranged between the glass sheets 1, 2. The edges of the substrate 311 may be curved to conform to the curved edges of the glass sheets 1, 2. The shape of the heat-generating layer 31 does not have to conform to that of the glass sheets 1, 2 completely. It can have a shape smaller than that of the glass sheets 1, 2 and be arranged only in the portions requiring a defogging effect. Note that the glass sheets 1, 2 can also have a shape other than that of a rectangle.

In the embodiment described above, the busbars 312, 313 and the heating wires 6 are arranged on a substrate 311. However, the heating wires 6 alone may be arranged on a substrate. For example, the busbars 312, 313 can be arranged between the adhesive layers 32, 33.

<5.5> Also, at least one bias wire can connect adjacent heating wires 6. In this way, adjacent heating wires 6 can be electrified even when a heating wire 6 has become disconnected. There are no particular restrictions on the number and positioning of the bias wires. For example, they may extend diagonally and have any shape, such as a wave shape. The bias wires can be made of the same metal material as the heating wires 6 and be integrally formed with the heating wires 6.

<5.6> There are no particular restrictions on the arrangement of the connecting members 41, 42 and the configuration of the notches 21, 22 in the inner glass sheet 2. For example, as shown in FIG. 8, notches 21, 22 that are not as thick as the connecting members 41, 42 can be formed in the inner glass sheet 2, and the connecting members 41, 42 extending from the busbars 312, 313 can be bent in the notches 21, 22 and bonded to the surface of the inner glass sheet 2. This can keep the connecting members 41, 42 from protruding in the plane direction from the ends of the laminated glass. Optionally, there are no notches.

<5.7> There are no particular restriction on the shape of the glass sheets 1, 2. The profile of the glass sheets can be any shape defined by an upper edge 11, a lower edge 12, a left edge 13, and a right edge 14, including but not limited to a rectangle. Each of the edges 11-14 can be a straight line or a curved line.

<5.8> The heating wires 6 do not have to be arranged in parallel. For example, they may form a mesh-like irregular shape. In the embodiment described above, the heating wires 6 are connected in parallel to the busbars 312, 313 serving as electrodes. However, they may also be connected in series. Also, any number of bent heating wires 6 can be arranged between the busbars 312, 313. Heating wires 6 may be configured in any pattern, for example a fan, meander or mesh. Interval L between wires may be variable.

<5.9> In the embodiment described above, the busbars 312, 313 were arranged, respectively, along the upper edge and the lower edge of the glass sheet. However, the busbars can also be arranged along the left edge and the right edge of the glass sheet with the heating wires running horizontally between them.

<5.10> In the embodiment described above, the laminated glass of the present invention was installed as the windshield of an automobile. However, it may also be applied as side glass or rear glass. There are no particular restrictions on the vehicle. In addition to automobiles, the laminated glass can be used in other passenger vehicles such as train cars and as window glass in buildings.

EXAMPLE

The following is a description of an example of the present invention. The present invention is not limited to the example described below.

The laminated glass in the example of the present invention and in the comparative example was prepared in the manner described below. The example and the comparative example have the following composition.
Inner glass sheet: thickness 2.1 mm, thermal conductivity 1 W/(m·K)
Heating wires: outer diameter 25 micrometres
Intermediate layer (adhesive layer): PVB, thickness 0.76 mm
Outer glass sheet: thickness 2.1 mm, thermal conductivity 1 W/(m·K)

In the example, the heating wires were arranged so as to come into contact with the inner glass sheet. In the comparative example, the heating wires were arranged in the centre of the intermediate layer in the thickness direction.

The example and the comparative example were evaluated in the following way. An electrical current was applied to the heating wires in the example and in the comparative example, and the cross-sectional temperature distribution was simulated in the laminated glass of the example and the comparative example, for the same resistance and voltage.

Figure 9:
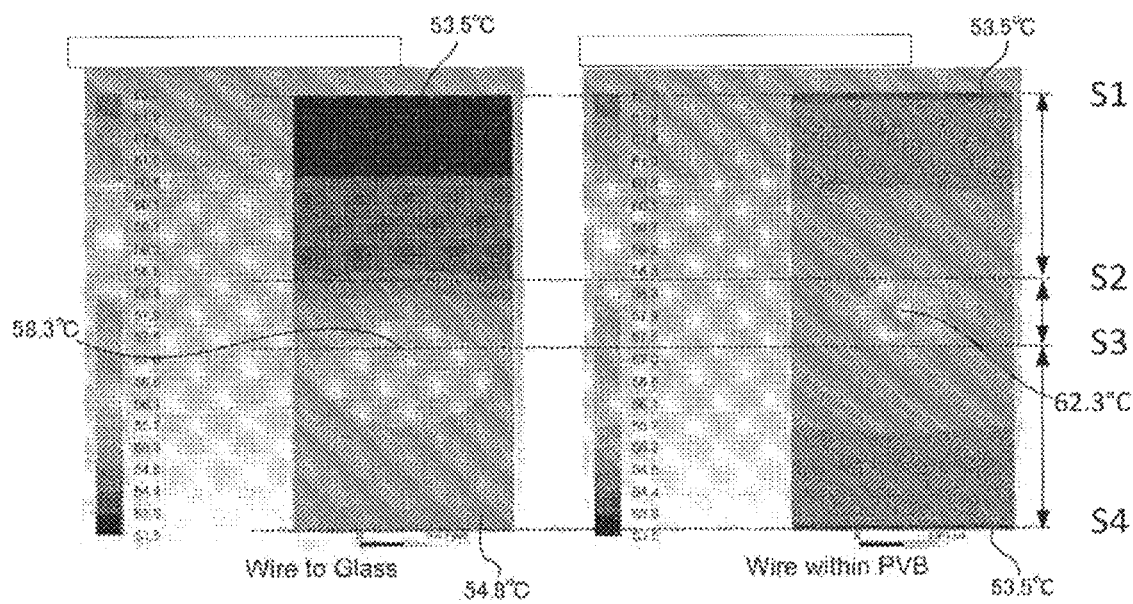
FIG. 9 is a diagram showing the laminated glass cross-sectional temperature distribution in an example of the present invention and in a comparative example.

The results are shown in FIG. 9. In FIG. 9, the vertical direction corresponds to the thickness direction of the laminated glass.

In the comparative example, as shown in FIG. 9, the temperature near the heating wires was a high temperature equal to or greater than 62° C. In the example, temperature of the adhesive layer was not more than 58.3° C., because the heating wires were close to the inner glass sheet, so the heat from the heating wires readily dissipated and the temperature near the heating wires was kept from rising. Therefore, the intermediate layer in the example experienced less distortion and outside objects viewed through the windshield are less likely to appear to be wavy.

Figure 10:
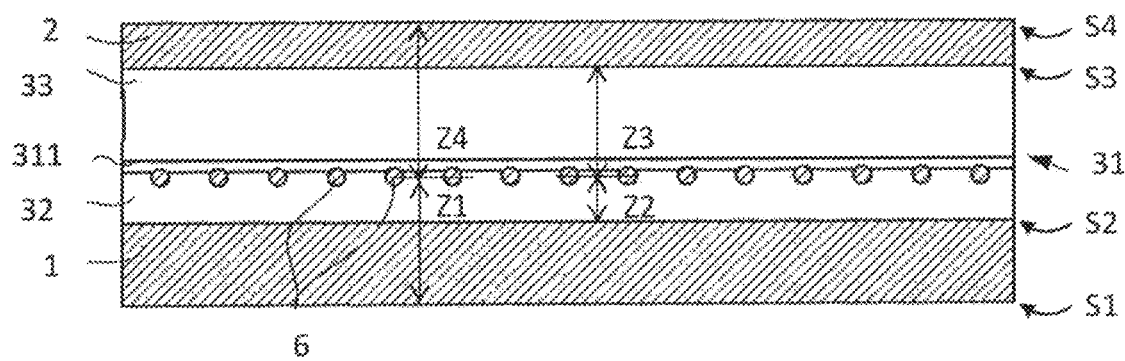
FIG. 10 shows the laminated glass in cross-section through the wires, having distances Z1, Z2, Z3, Z4 from the centres of the heating wires to the surfaces S1, S2, S3, S4 respectively.

In the example shown in FIG. 10, the adhesive layer 33 is a layer of PVB of thickness 250 micrometres, 100 micrometres, 75 micrometres, 50 micrometres, 20 micrometres or 10 micrometres. For example, the adhesive layer is obtainable under the trade name Mowital and product code LP BF 6-050, thickness 50 micrometres+/−5%, from Kuraray Co, Ltd, Ote Center Building, 1-1-3 Otemachi, Chiyoda-ku, Tokyo 100-8115, Japan. Surprisingly, a layer of adhesive as thin as 50 micrometres is sufficient to bond the bonded surface S3 of the inner glass sheet, such that the laminated glass passes necessary national tests for strength of vehicle glazing, and at the same time reduces optical distortion to a level acceptable to drivers of vehicles.

Key to the Drawings
1: Outer glass sheet
2: Inner glass sheet
3: Intermediate layer
11, 12: Upper edge, Lower edge
13, 14: Left edge, Right edge
21, 22: Notches
31: Heat-generating layer
311: Substrate
312, 313: First busbar, Second busbar
32: First adhesive layer
33: Second adhesive layer; Adhesive layer
41, 42: Connecting member
5: Fixing material
6: Heating wires
7: Concealing layer
800: Mold
802: Heating furnace
803: Annealing furnace
810: Mold unit
840: Shielding plate
D: Thickness of the thinner of the adhesive layers
L: Interval between adjacent heating wires
S1: Outside surface of outer glass sheet
S2: Inside surface of outer glass sheet
S3: Outside surface of inner glass sheet
S4: Inside surface of inner glass sheet
Z1: Distance from centre of heating wires to outside surface of outer glass sheet
Z2: Distance from centre of heating wires to inside surface of outer glass sheet
Z3: Distance from centre of heating wires to outside surface of inner glass sheet
Z4: Distance from centre of heating wires to inside surface of inner glass sheet

The invention claimed is:

1. Laminated glass comprising:
    an outer glass sheet having an upper edge and a lower edge opposing the upper edge,
    an inner glass sheet arranged opposite the outer glass sheet and having substantially the same shape as the outer glass sheet, and
    an intermediate layer arranged between the outer glass sheet and the inner glass sheet
    the intermediate layer having a heat-generating layer comprising:
    a first bus bar extending along an end portion on the upper edge side,
    a second bus bar extending along an end portion on the lower edge side, and
    a plurality of heating wires arranged so as to connect the first bus bar and the second bus bar,
    a sheet-like substrate for supporting at least the plurality of heating wires among both busbars, wherein the plurality of heating wires is arranged on the sheet-like substrate
    wherein the intermediate layer further comprises an adhesive layer adjoining the heat-generating layer such that the plurality of heating wires is disposed between the sheet-like substrate and the adhesive layer or the sheet-like substrate is disposed between the plurality of heating wires and the adhesive layer
    a distance from the centre of the heating wires in a thickness direction to a surface of the outer glass sheet and a distance from the centre of the heating wires in a thickness direction to a surface of the inner glass sheet being different,
    characterised by:
    a distance from the centre of the heating wires in a thickness direction to an inside surface of the outer glass sheet and a distance from the centre of the heating wires in a thickness direction to the outside surface of the inner glass sheet being different wherein a thickness of the adhesive layer or thickness of the substrate whichever having smaller thickness is not more than 400 micrometres.

2. Laminated glass according to claim 1, wherein the thickness of the outer glass sheet and the thickness of the inner glass sheet are different.

3. Laminated glass according to claim 1, wherein the heat-generating layer comes into contact with the inner glass sheet.

4. Laminated glass according to claim 1, wherein the intermediate layer further comprises a pair of adhesive layers sandwiching the heat-generating layer, the thickness of each of the pair of adhesive layers being different.

5. Laminated glass according to claim 1, wherein
    the surface of the plurality of heating wires is subjected to blackening treatment
    the plurality of heating wires is arranged on the outer glass sheet side, and
    the substrate is arranged on the inner glass sheet side.

6. Laminated glass according to claim 1, wherein a distance from the centre of the heating wires in the thickness direction to the inside surface of the outer glass sheet or a distance from the centre of the heating wires in the thickness direction to the outside surface of the inner glass sheet is not more than 400 micrometres.

7. Laminated glass according to claim 1, wherein the distance from the centre of the heating wires in the thickness direction to the inside surface of the outer glass sheet or the distance from the centre of the heating wires in the thickness direction to the outside surface of the inner glass sheet is not less than 5 micrometres.

8. Laminated glass according to claim 1, wherein the heating wires comprise copper, tungsten, silver or molybdenum or alloys thereof.

9. Laminated glass according to claim 1, wherein each heating wire in cross-section has a shape of a circle, an oval, a triangle, a square, a rectangle or a trapezoid.

10. Laminated glass according to claim 1, wherein the busbars and the plurality of heating wires can be formed integrally.

11. Laminated glass according to claim 1, wherein the plurality of heating wires is printed, etched, transferred or preformed.

12. Laminated glass according to claim 1, wherein the adhesive layer or the pair of adhesive layers comprises PVB or PVB having an adhesion control additive.

13. Laminated glass according to claim 1, wherein the substrate, the adhesive layer or the pair of adhesive layers can be provided with an infrared absorbing layer.

14. Laminated glass according to claim 1, wherein the plurality of heating wires comprises preformed wires on the sheet-like substrate.

15. Laminated glass according to claim 1, wherein both busbars and the plurality of heating wires are formed integrally on the sheet-like substrate as etched metal foil.

16. Use of a laminated glass according to claim 1 in a vehicle for transport on land, water or in the air, or in a building, in digital signage or in a refrigerator door.

17. Method of manufacturing a laminated glass comprising:
providing an outer glass sheet having an upper edge and a lower edge opposing the upper edge
arranging an inner glass sheet opposite the outer glass sheet, wherein said inner glass sheet has substantially the same shape as the outer glass sheet
arranging an intermediate layer between the outer glass sheet and the inner glass sheet, the intermediate layer having a heat-generating layer comprising a first busbar extending along an end portion on the upper edge side, a second busbar extending along an end portion on the lower edge side
arranging a plurality of heating wires so as to connect the first busbar and the second busbar,
arranging a sheet-like substrate for supporting at least the plurality of heating wires among both busbars, wherein the plurality of heating wires is arranged on the sheet-like substrate
wherein the intermediate layer further comprises an adhesive layer adjoining the heat-generating layer such that the plurality of heating wires is disposed between the sheet-like substrate and the adhesive layer or the sheet-like substrate is disposed between the plurality of heating wires and the adhesive layer
a distance from the centre of the heating wires in a thickness direction to a surface of the outer glass sheet and a distance from the centre of the heating wires in a thickness direction to a surface of the inner glass sheet being different,
a distance from the centre of the heating wires in a thickness direction to an inside surface of the outer glass sheet and a distance from the centre of the heating wires in a thickness direction to the outside surface of the inner glass sheet being different wherein a thickness of the adhesive layer or the thickness of the substrate whichever having smaller thickness is not more than 400 micrometres.

18. Method according to claim 17, wherein the plurality of heating wires comprises preformed wires on the sheet-like substrate.

19. Method according to claim 17, wherein both busbars and the plurality of heating wires are formed integrally on the sheet-like substrate as etched metal foil.

* * * * *